March 13, 1928.
H. J. BAKER
SOLDERING IRON
Filed Aug. 11, 1925
1,662,734
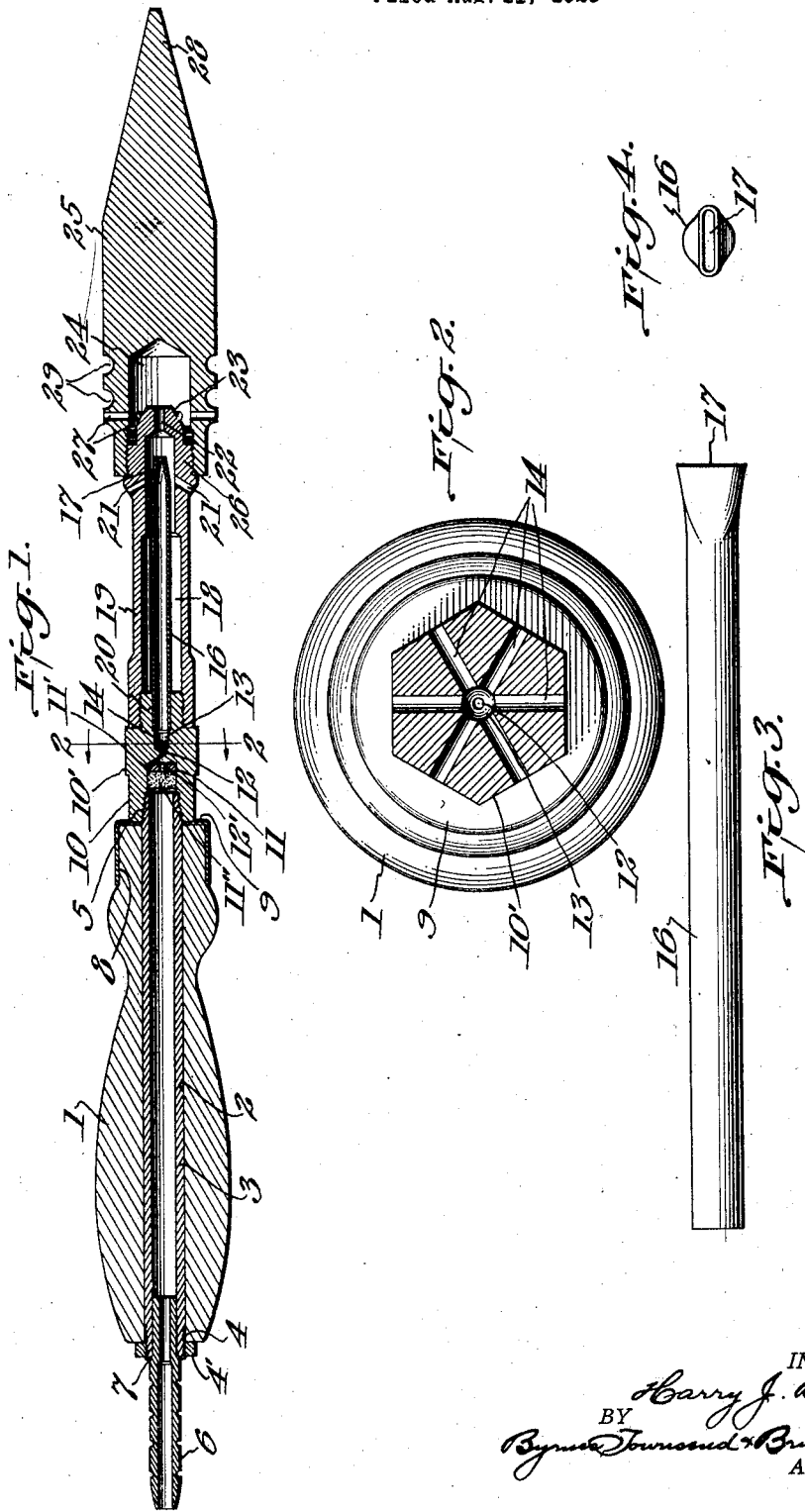
INVENTOR:
Harry J. Baker,
BY
Byrnes Townsend & Brickenstein,
ATTORNEYS.

Patented Mar. 13, 1928.

1,662,734

UNITED STATES PATENT OFFICE.

HARRY. J. BAKER, OF INDIANAPOLIS, INDIANA, ASSIGNOR TO THE PREST-O-LITE COMPANY, INC., A CORPORATION OF NEW YORK.

SOLDERING IRON.

Application filed August 11, 1925. Serial No. 49,610.

This invention relates to soldering irons, more particularly to self-heating soldering irons in which a gaseous fuel is used as the heating medium.

One of the objects of this invention is to provide a soldering iron utilizing a non-exposed gaseous heating flame, whereby the usual danger of accident and fire in the exposed-flame iron are eliminated.

Another object of the invention it to provide a soldering iron in which substantially all of the heat of combustion of the fuel is absorbed by the bit of the iron, thus increasing its efficiency and reducing the consumption of gas.

A further object is to provide a soldering iron in which the bit is readily detachable, so that bits of various shapes and proportions may be used with a single burner.

The above and other objects and the novel features of this invention will appear from the following description taken with the accompaying drawings forming a part of this specification, and in which:

Fig. 1 is a central longitudinal sectional view of a soldering iron embodying this invention;

Fig. 2 is an enlarged sectional view, taken on the line 2—2 of Fig. 1; and

Figs. 3 and 4 are, respectively, a top view and an end view of the torch head stem, on an enlarged scale.

In the soldering iron herein illustrated, the numeral 1 designates the handle of the iron which is preferably made of heat non-conducting material and has a longitudinally extending passage 2 containing an inlet or adapter pipe 3 having external threads 4, 5 at opposite ends thereof. A nut 4' is screwed on threads 4 to hold the outer end of the handle in place. The end of hose nipple 6 is secured into the rear end of the pipe 3, as by solder 7. This nipple may be connected to any desired source of gas, such as acetylene, for heating the iron. A ferrule 8, having an inturned flange 9 fits the front end of the handle.

A torch head or fitting 10 is screwed on the threads 5 coaxial with the pipe 3 at the front end thereof, and bears against the inturned flange 9 to hold the handle securely in place. The inlet passage 11 of the torch head is tapered to a small orifice or throat 12, so that there is a substantial reduction in area from the entrance of said inlet passage to said throat. A loose packing 11″ of cotton asbestos and a perforated disk 11′ having a central aperture 12′ of somewhat larger area than the throat 12 may be placed in the passage 11 to prevent entry of foreign material which might clog the throat 12. Beyond the said throat the size of the bore is increased to form a primary mixing passage 13 that is of smaller area than the inlet 11. The exterior of the head has a section 10′ that is of hexagonal or non-cylindrical shape to facilitate the use of a wrench in securing the head to the pipe 3. A plurality of main or primary air inlet ports 14 extend radially through the hexagonal section 10′ and open into the mixing passage 13 ahead of the throat 12, and admit air from the atmosphere to the interior of the torch head for admixture with the acetylene or other gaseous fuel issuing from the throat 12.

The gas and air is further mixed in a torch head stem 16, that is secured in an enlargement of the mixing passage 13. The front end of the stem is tapered or partially flattened to provide a wide mouthed nozzle 17 having an elongated narrow outlet orifice through which the gaseous mixture discharges into the secondary mixing chamber 18 that is provided within a tubular soldering bit support 19. The slot-like construction of the mouth of the nozzle 17 is of special importance here because in cooperation with the other elements of the device it produces a peculiar or typical noise when the iron is in use that serves to inform the operator when the gas is burning. In the usual type of nozzle, the flame may become extinguished and some time may elapse before the operator is aware of it, in the meantime the operator may be working with a comparatively cold iron and doing inferior work.

The bit support 19 is internally threaded at its rear end to fit suitable exterior screw threads on a reduced section 20 at the front end of the head 10, and is concentric with the stem 16 and spaced outwardly therefrom to provide the second or auxiliary mixing chamber 18 therebetween. A plurality of inclined auxiliary air inlet ports 21 extend through the wall of the tube 19 to a zone adjacent but slightly to the rear of the outlet of the nozzle 17, to improve mixing and combustion of the gases and also to prevent backfiring when the gaseous fuel is shut off. These ports admit any additional air which may be necessary for complete combustion of the fuel gas. The mixture of air and acetylene that has been conveyed to the auxiliary mixing chamber 18 discharges from the latter through an outlet 22 in a burner tip 23 at the front end of said chamber. The outlet 22 is axially in line with and a distance in front of the outlet of the nozzle 17, and is of larger area than the latter but of smaller area than the mixing chamber 18.

The flame produced by the gases issuing from the burner tip is projected into a central cavity 24 forming a combustion chamber in the rear end of the head of a soldering tip or bit 25 which is internally threaded to be screwed on an externally threaded portion 26 of the bit support 19, whereby the combustion chamber is closed at its rear end. This threaded coupling is slightly back of the burner tip 23, so that the latter projects well into the combustion chamber in the bit. By this arrangement, substantially all of the heat from the burning gases is absorbed by the iron, thus effecting a great economy in fuel consumption. The combustion chamber is provided with a plurality of radial exhaust ports 27 to take care of improper combustion while the iron is being heated and also to allow burned gases to escape after these serve the purpose of imparting heat to the iron. As shown, one or more rows of such ports are drilled through the wall of the cavity 24, one row being desirably slightly back of the orifice in the tapering tip 23. The front of the bit may have any desired shape, and is shown as having a pointed end 28 of the conventional type. The conduction of heat backward to the handle portion may be reduced by suitable means, as by circular grooves 29 which reduce the thickness of the wall of the cavity 24.

In the operation of the iron, the hose nipple is connected through a control valve (not shown) to any suitable supply of gaseous fuel, such as acetylene under pressure. The gas flows through the adapter pipe, and then through the torch head. The acetylene issues at an increased velocity from the throat in the said head, providing an injector action that creates a suction whereby air is drawn in through the main air inlets 14. This air is discharged through the torch head stem and mixed with the stream of fuel. The combustible mixture of gas and air discharges through the nozzle of the stem into the auxiliary mixing chamber where more intimate intermingling of the gases takes place. Any additional air which may be required is drawn in through the auxiliary air inlets in the auxiliary mixing chamber. The mixed gases issue from the orifice in the burner tip where they are burned. The flame of the burning gases projects into the central cavity in the soldering tip of the iron, and impinges against the enclosing surfaces. The exhaust ports leading from the combustion cavity permit the escape of the products of combustion. The pressure of the acetylene or other fuel gas may be so regulated that there will be complete combustion of the mixture in the cavity of the tip and so that no flame shall issue from the ports 27. With an acetylene gas pressure of about 5 pounds, excellent results have been obtained when using a throat 12 that is .009" diameter; six air inlets 14, each about .094" diameter; four auxiliary air inlets 21, each about .075" diameter; and eight exhaust ports 27, each about .110" diameter. The diameter of the aperture in the filter disk 11' may be about .040". Of course, these dimensions are illustrative only and may be varied to suit the particular fuel gas and pressure employed.

The construction of the improved iron affords a number of distinct advantages; it does not clog up and stop burning, it has a fully enclosed and therefore invisible flame, it does not heat excessively at the handle portion and hose connection, all of which contributes to produce a high efficiency because practically all of the heat from the combustion of the gas is utilized in heating the tip of the iron.

While I have illustrated and described a preferred form of soldering iron embodying this invention, it is to be understood that various changes may be made therein without departing from the scope and spirit of the invention.

Having now described my invention, I claim:

1. A soldering iron comprising a gas passage terminating in a nozzle, said passage also having a throat intermediate its ends and air inlet means between said throat and said nozzle; a mixing chamber into which said nozzle discharges; a soldering bit having a combustion chamber provided with exhaust means; and a burner tip communicating with said mixing chamber and projecting into said combustion chamber.

2. A soldering iron comprising a fuel gas passage terminating in a nozzle, said passage also having a throat intermediate its ends and air inlet means adjacent said throat between the latter and said nozzle; a mixing chamber into which said nozzle discharges, said mixing chamber surrounding said passage behind said nozzle; a soldering bit having a combustion chamber provided with exhaust ports; and a burner tip disposed in front of said nozzle, said burner tip communicating with said mixing chamber and projecting into said combustion chamber.

3. A soldering iron according to claim 1, in which said mixing chamber has auxiliary air inlet means, and said combustion chamber has exhaust means back of the outlet of said burner tip.

4. A soldering iron comprising a handle, a fuel gas pipe extending axially through said handle; a torch head mounted on said pipe adjacent the front end of said handle, said head having a passage restricted by a throat intermediate its ends and air inlet means beyond said throat; a hollow stem having one end secured to said head and terminating in a nozzle at its opposite end; a tube mounted on said head concentrically with but spaced from said stem to provide a mixing chamber between such tube and stem into which the nozzle of the latter discharges; a soldering bit secured to said tube and having a combustion chamber coaxial therewith; said tube carrying a burner tip at its forward end that projects into said combustion chamber.

5. A soldering iron comprising a handle; a fuel gas pipe extending axially through said handle; a torch head mounted on said pipe adjacent the front end of said handle, said head having a passage restricted by a throat and air inlet means beyond said throat; a hollow stem having one end secured to said head and terminating in a wide-mouth nozzle at its opposite end; a tube mounted on said head concentrically with but spaced from said stem to provide a mixing chamber between such tube and stem into which said nozzle discharges, said tube having auxiliary air inlets leading into said mixing chamber; a soldering bit secured to said tube and having a combustion chamber coaxial therewith, the wall of said combustion chamber having exhaust ports and also having one or more sections of reduced thickness; and said tube carrying a burner tip at its forwad end that projects into said combustion chamber.

In testimony whereof, I affix my signature.

HARRY J. BAKER.